United States Patent
MacLean

[19]
[11] Patent Number: 5,865,543
[45] Date of Patent: Feb. 2, 1999

[54] BEARING FAILURE DETECTION APPARATUS

[76] Inventor: James K. MacLean, 90 Montezuma Trail, Scarborough, Ontario M1V 1H8, Canada

[21] Appl. No.: 822,710

[22] Filed: Mar. 21, 1997

[51] Int. Cl.$^6$ .................................................. F16C 19/52
[52] U.S. Cl. ........................................................... 384/448
[58] Field of Search .................................. 384/448, 544, 384/589, 624

[56] References Cited

U.S. PATENT DOCUMENTS

| | | | |
|---|---|---|---|
| 3,373,300 | 3/1968 | Sullivan | 384/448 |
| 4,063,786 | 12/1977 | Rall | 384/448 |
| 5,244,287 | 9/1993 | Yoshikawa | 384/448 |

*Primary Examiner*—Lenard A. Footland
*Attorney, Agent, or Firm*—Edward H Oldham

[57] ABSTRACT

A warning device for the detection of a bearing malfunction in wheel assemblies of large commercial vehicles such as tractors and semi-trailers is disclosed. The warning device is preferably mounted on the stationary axle inside the wheel housing adjacent the brake mounting assembly to remain stationary. The device includes a probe which protrude outwardly so as to have a sensing end extend until it is a predetermined instance from the rotating brake drum, say 25–50 thousandths of an inch. As long as the brake drum is running true, the distance between the sensing end of the probe and the inner braking surface of the brake drum remains constant. If either wheel bearing becomes incapacitated for some reason which permits the brake drum to run out of true, the inner braking surface will contact the end of the sensing probe which activates a signalling device in the cab of the vehicle to alert the driver of the presence of a dangerous condition.

10 Claims, 3 Drawing Sheets

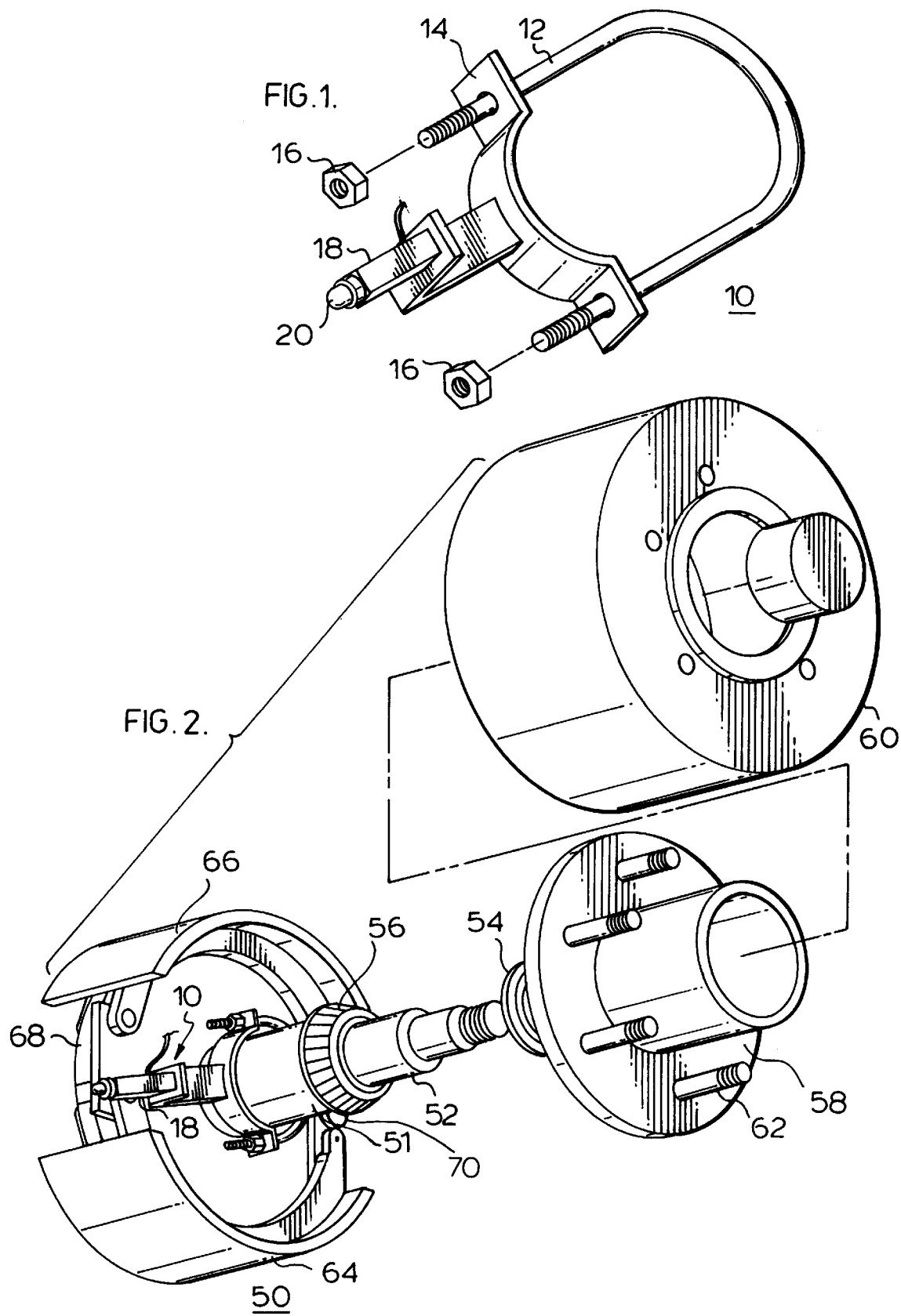

BEARING FAILURE DETECTION APPARATUS

BACKGROUND OF THE INVENTION

Most, if not all, commercial trucking vehicles use a standard axle and bearing configuration to mount the wheels on the axle. The construction of the axle housing differs somewhat between whether the axle is mounted on a tractor, where a differential gear device is connected to a pair of oppositely extending hollow tubes to provide means to permit the transmission if power from the differential gear device to the wheels, or whether the axle is mounted on a semi-trailer where the axle is a solid body.

Regardless of the application, i.e. tractor or semi-trailer, the wheel assembly and method of mounting the wheel assembly on the axle generally follows a standard pattern and procedure.

The axle whether hollow (tractor) or (trailer) provides a base unit to which a brake shoe anchor bracket is mounted. A splash guard or backing plate for the braking assembly of the vehicle may also be mounted on the axle.

A pair of brake shoes are mounted on the brake shoe anchor bracket and are spring loaded to be normally in a retracted position. The brake shoes are usually activated by a brake camshaft which twists to force the ends opposite the mounting pivots of the brake shoes apart, so as to contact a surrounding rotating brake drum and apply a braking effort.

The brake drum is mounted on a rotor or hub which is mounted on the axle. In either case, the hub or drum is provided with a pair of spaced wheel bearings (usually tapered) which provide the anti-friction means to permit the wheel assembly to rotate with minimum runout and yet endure the forces imposed by gravity, braking, acceleration and shocks due to uneven road surfaces. At the same time, the lateral forces on the two bearings imposed by the twisting torque imposed on the wheel bearings of a trailer during the execution of a turn on a concrete or asphalt surface can be significant.

The hollow rotor or hub assembly is usually partially filled with a lubricating oil to provide a permanent method of lubricating the two wheel bearings. This means that both ends of the rotor must be provided with sealing means to prevent the escape of lubricating oil from the rotor cavity.

The axle itself is usually tapered so that the wheel bearings inside the rotor have markedly different diameters, such that the bearing having larger diameter of the two bearings is located inboard (nearer the differential gear device) and the smaller diameter bearing is outboard.

The inboard seals in the wheel assemblies are subjected to wear, aging, mechanical damage, intrusion of foreign matter in the seal-shaft interface which may cause damage to the sealing membrane of the seal. As a result, the oil level in the rotor hub may drop as the bearing oil gradually leaks past the inboard seal to escape from the hub cavity. As the oil leaks from the cavity, the usual occurrence will be that the outboard wheel bearing (smaller) will be the first bearing to undergo lubrication oil starvation, because it is at a higher level on the axle, (due to its smaller diameter). Usually, this condition will be found during routine maintenance operations, but if it is not detected, the failure of the outboard bearing is almost inevitable.

The two wheel bearings are usually held in compression on the axle by a double-nut-ring locking mechanism which applies compressive forces to the two inside races of the wheel bearings.

If the rollers of the outboard bearing disintegrate due to failure of the lubrication system, the rotor may allow the whole wheel assembly to leave the axle because the diameter of the aperture in the inboard outer bearing race is usually greater than the outer diameter of the inner race of the outboard bearing (which remains captive on the axle, because of the locking mechanism on the axle).

Thus, the failure of the inboard seal can give rise to a lubrication deficit which even though gradual, can lead to the condition where the outboard bearing fails and the wheel-brake drum-rotor assembly may leave the axle. If this occurs on a tractor, the driver may be alerted to the bearing failure by abnormal driving symptoms or the generation of excessive noise. If this malfunction occurs on an axle of a trailer at a distance of some forty feet from the driver during a freight delivery operation, the malfunction or absence of the wheel assembly may go undetected for a considerable distance before the driver of the transport vehicle becomes aware of the problem. As the tapered outboard bearing enters its failured mode, the hub is no longer held in a concentric relationship with the axle spindle, thus the hub moves upwardly and backwardly on the spindle as the bearing rollers begin to disintegrate. The device of this invention is adapted to sense this eccentricity and immediately alert the driver of a pending failure of a wheel bearing before the above described condition deteriorates to the situation where the whole wheel assembly (including brake drum) leaves the vehicle. This device will perform equally well on tractors or trailers.

DESCRIPTION OF THE PRIOR ART

U.S. Pat. No. 5,244,287 issued Sep. 14, 1993.

This patent is a bearing malfunction detecting device generally directed to the detection of imminent failure of a vehicle water pump bearing before shutdown of the vehicle engine is necessary. This device requires that an accessory ring be mounted on the water pump shaft during manufacture of the pump (making a retrofit a very difficult operation). This ring which rotates with the waterpump shaft includes a protruding flange which passes between a pair protruding prongs of a fork of a sensing device so that under normal operating conditions the protruding flange rotates between the fork prongs without any contact. Upon the occurrence of a bearing malfunction, the flange of the rotating ring fractures one of the prongs (frangible) of the fork which contains a loop of sensing wire which becomes an open circuit in a sensing circuit.

U.S. Pat. No. 4,063,786 issued Dec. 20, 1977.

This patent describes a compound bearing of a type which includes two bearing member, a standard anti-friction bearing adjacent to a bearing which is activated during failure of the anti-friction bearing. An insulated probe is contacted by a bearing runner under bearing failure conditions to abrade away the insulation on said probe to "ground" the probe to indicate that main anti-friction bearing failure has occurred and maintenance is required.

U.S. Pat. No. 3,373,300 issued Mar. 12, 1968.

SUMMARY OF THE INVENTION

This invention provides a probe which may be fitted to the axle of a tractor or a trailer to detect the presence of a predetermined amount of eccentricity in the rotating wheel hub of a tractor or trailer. The device is applicable to tractors or trailers having either disc or drum braking systems.

Basically in its simplest form, the device is a probe which is permanently fastened to the axle (for use with a drum braking system) which has a protruding probe, the end of which has a spring loaded head which may be accurately located and adjusted so as to be a predetermined distance from the braking surface of the rotating drum. The probe is stationary and in normal use does not interfere with the wheel rotation or the function of the braking shoes, etc.

It is only when a bearing failure begins to occur that the probe head is contacted by the eccentrically rotating hub to cause a signal to be generated by the probe assembly to notify the driver in the cab that a problem is occurring and remedial action should be investigated forthwith.

BRIEF DESCRIPTION OF THE DRAWINGS

FIG. 1 illustrates the device of this invention;

FIG. 2 shows a perspective view of the device of this invention mounted on the axle of a truck wheel and brake drum assembly;

DESCRIPTION OF THE PREFERRED EMBODIMENT

Figure 3:
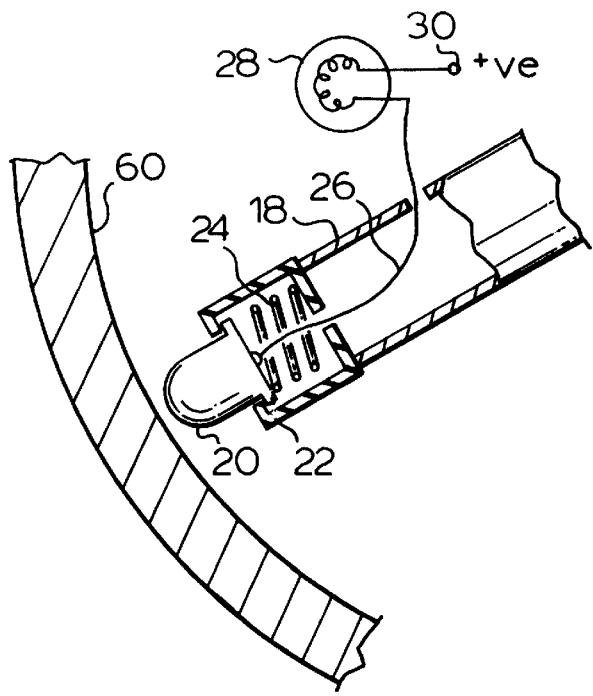
FIG. 3 shows an illustration of the probe and representative circuitry.

Referring to FIG. 1, the device of this invention is shown in perspective. Device 10 comprises a U-shaped clamping member 12 and bracket 14, having a pair of nuts 16 for clamping bracket and member 12 to a preselected surface.

A probe 18 is attached to bracket 14 by any convenient method such as welding, riveting, etc. so that probe 18 and bracket 14 become an integral assembly. Probe 18 provides a housing and mounting means for head 20 which is a spring loaded contact member which may be depressed into probe 18 from its normal fixed protruding position. In this instance, head 20 is a conductive member and is insulated from the body of probe 18.

FIG. 2 is a perspective of a commercial vehicle wheel-axle assembly showing device 10 mounted on the assembly. FIG. 2 shows an exploded partial perspective view of a commercial vehicle wheel assembly 50, an axle 51 of a commercial vehicle type such as may be found on a semi-trailer used for haulage of commercial freight. Axle 50 ends in protruding spindle 52 on which bearings 54 and 56 are mounted. The configuration of the bearings 54 and 56 on the hub of 52 is standard and will not be given in detail (a copy of page 1–41 of Euclid Industries Inc. appears with this application for the reader's convenience (with permission)).

A rotor 58 is mounted on bearings 54 and 56 to which brake drum 60 is secured on bolts 62. Brake drum rotates about spindle 52 in close proximity to brake shoes 64 and 66. Brake shoes 64 and 66 are mounted on brake shoe anchor device 68 which is firmly fixed to axle 50. The opposing ends of brake shoes 64 and 66 are engaged by a cam member 70 which is twisted by a brake application device (not shown) to open the ends of the brake shoes to engage the drum.

The device 10 of this invention is mounted on spindle 52 adjacent the inboard bearing 56 by means of clamp device 12–14. Probe 18 is passed between the ends of brake shoes 64 and 66, in this instance at the anchor bracket end. If possible, it is preferable to orient probe 10 so that it points downwardly in the normal direction of travel of the vehicle.

FIG. 3 shows an enlarged sectional view of probe 10 to provide additional details of its construction. Head 20 is mounted on insulating member 22. Spring 24 assures that head 20 is in its predetermined extended position. Insulated wire 26 is connected to warning lamp 28 and to a source of potential 30.

It is important that the normal "rest" position of head 20 be defined fairly accurately for reasons to be discussed later. It may be necessary to provide adjustment means on probe 18 to allow the head 20 to be initially adjusted during installation of device 10.

Figure 4:
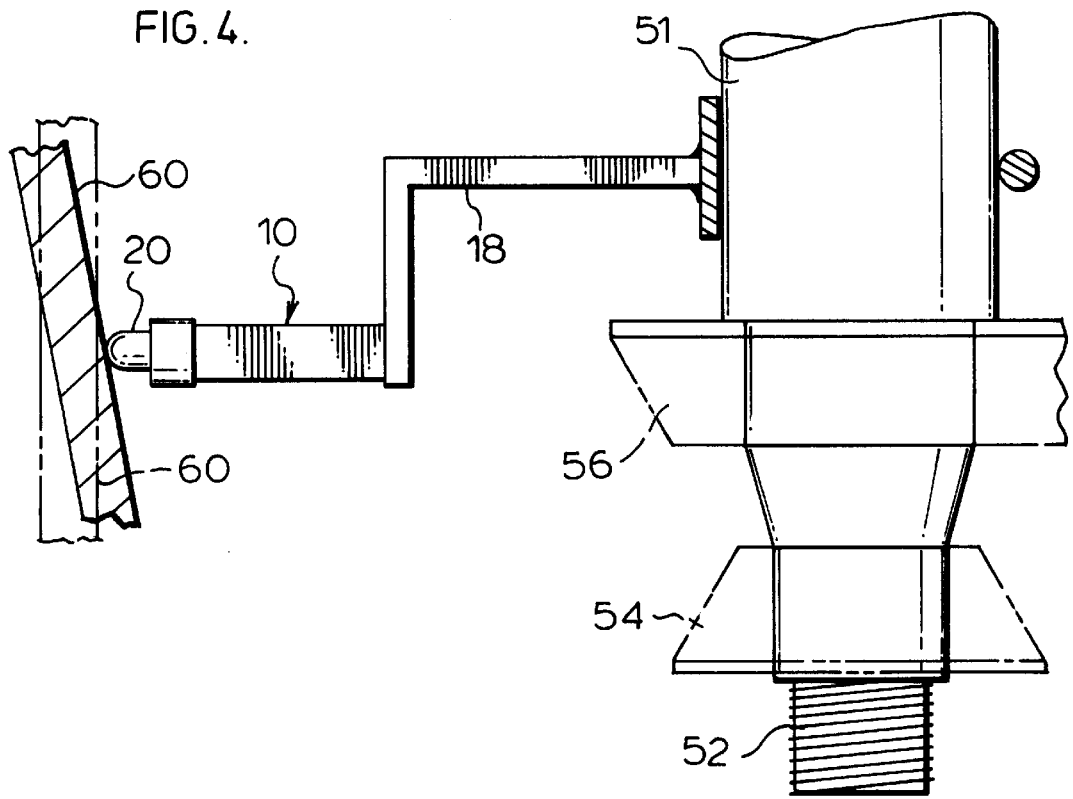
FIG. 4 shows an illustration of a malfunctioning drum in the presence of a failed bearing.

FIG. 4 shows the operation of probe 10 in the presence of a wobbling brake drum, caused by a failure of one of the wheel bearings 54 or 56.

Figure 5:
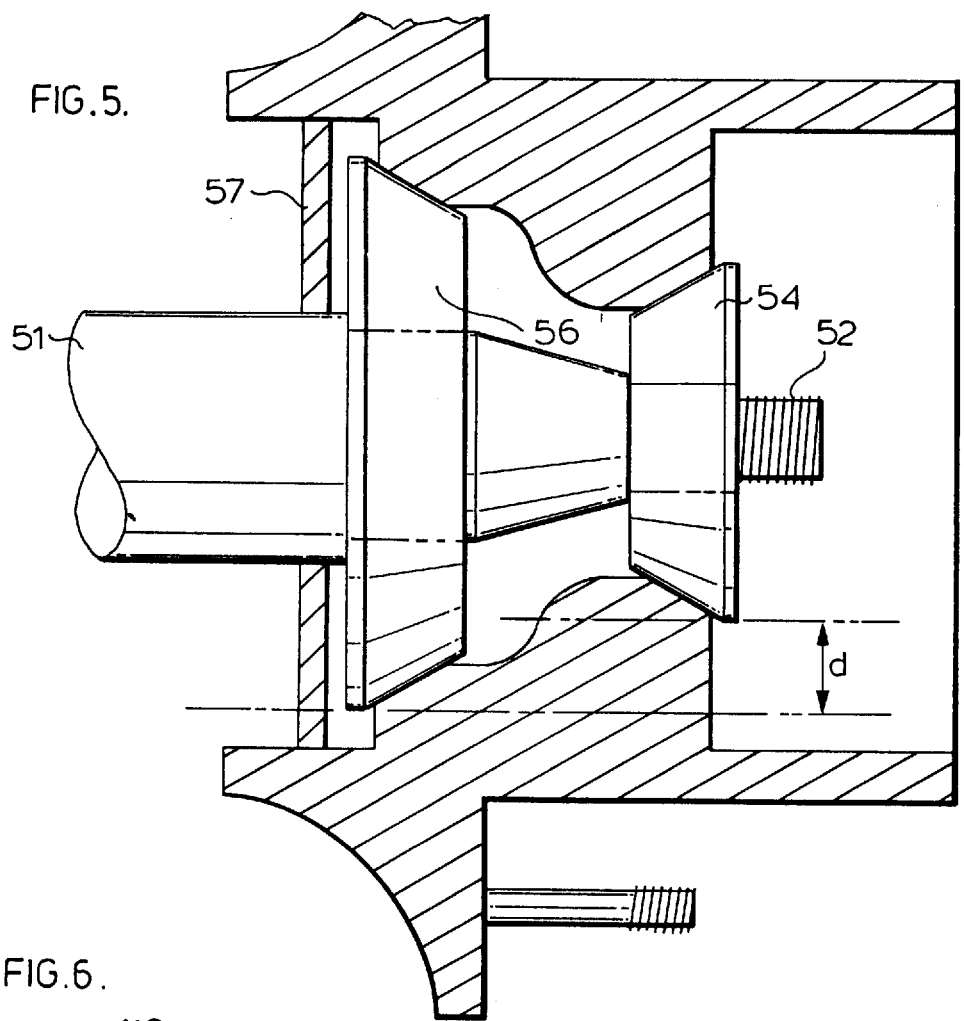
FIG. 5 shows the bearing orientation and oil level of a wheel hub.

FIG. 5 shows the configuration of the bearings in a commercial wheel assembly of a trailer to illustrate how the oil level affects the operation of the bearing-hub assembly. This figure illustrates how depletion of the oil in the hub assembly causes failure of the smaller outboard bearing first. Distance "d" shows the difference in diameters of the bearings 54 and 56. Item 57 represents a seal.

In summary, probe 10 may be attached to each spindle of a modern tractor trailer rig to sense any brake drum wobble. Head 20 may be mounted fairly close to the inner braking surface of the drum, say 25 one thousandths of an inch. The inner diameter of the brake drum is allowed to grow as the surface is abraded away by the application of the brake shoes. In any instance, the device 10 will detect imminent bearing failure even in the presence of a worn brake drum even where the distance between the head 20 of device 10 is spaced 80–100 thousandths of an inch from the inner surface of the drum (due to drum wear). In the event the wheel eccentricity reaches 100 thousandths of an inch, the head 20 contacts the drum and a warning device in the cab alerts the driver of an impending bearing problem.

In this instance, probe 10 has been shown attached to the land on spindle between the inboard bearing and the brake shoe anchor bracket on which the brake shoes pivot. Probe 10 may be mounted on any convenient stationary member of the interior of the wheel-brake drum assembly as long as the probe 10 is solidly maintained at a predetermined distance from a true rotating drum.

Device 10 functions best when probe 18 faces forward in a slightly downward fashion in the usual direction of travel. Because the application brakes on a vehicle produces a much greater force on the wheel assembly than the forces generated during an acceleration mode, the maximum eccentric motion of the wheel assembly on the spindle occurs during the braking mode.

A grounding head 20 is shown in this instance, but probe 10 may include a switch in its structure which closes when head 20 contacts the brake drum surface. Many variations are possible including the use of a proximity sensing circuit which does not need to contact the wobbling brake drum in order to provide a warning signal. The ability to detect a wobbling brake drum in the initial stages of bearing failure offers many advantages to the freight hauler and an added measure of safety to the motoring public.

Figure 6:
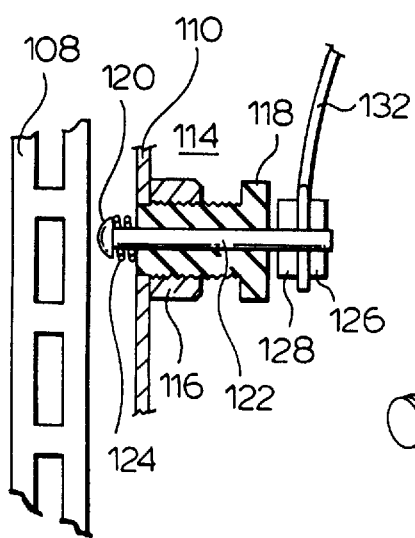
FIGS. 6 and 7 show an illustration of this device to a disc brake application.
Figure 7:
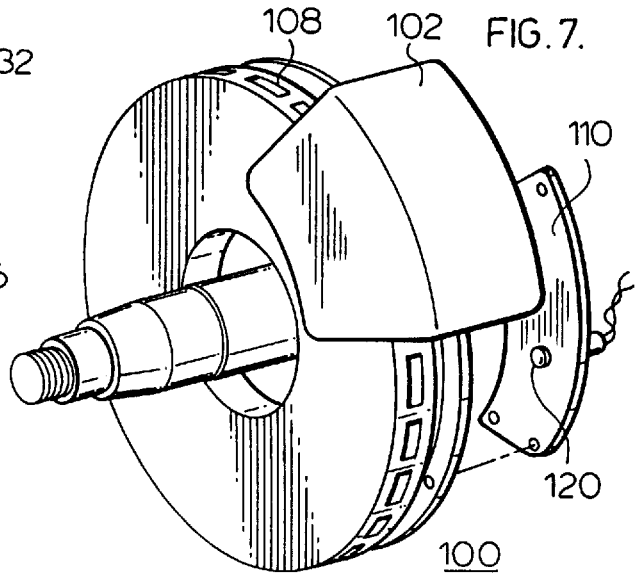

FIG. 6 shows an illustration of the sensing device of this invention when used with a disc brake apparatus.

The axle assembly 100 shows a caliper brake housing 102. The calipers straddles disc 108 in a conventional manner. The hub and spindle apparatus are the same as previously shown, except a disc is bolted to the hub in place of the drum.

An inspection plate 110 is generally mounted on a flange on the axle to permit access to disc 108 for visual inspection of the disc 108. Plate 110 is generally bolted to the flange on the axle.

A sensing device 114 is preferably mounted on the inspection plate 110 at a location adjacent the top of the disc as shown in FIG. 6.

A carrier member 116 in this instance is shown welded to plate 110. Member 116 serves to mount an insulating housing 118 which is threaded into member 116 to adjust the sensing head 120 with respect to disc 108.

Sensing head 120 is integrally connected to shaft 122 which is slidable in housing 118. Spring 124 biases head 120 towards disc 108. A pair of lock nuts 126 and 128 assure proper pressure on terminal 130 which is attached to insulated conductor 132 for the provision of carrying an electric signal to the cab of the vehicle associated with axle 100. Nut 128 provides a "stop" for the limit of travel of head 120 in a direction toward disc 108.

In practice, holder 116 which may be metallic or nonmetallic is in some way fastened to inspection plate 110. In some instances the device 114 may be mounted on a probe similar to the probe shown in FIG. 1 for mounting on the axle housing of the vehicular apparatus in instances where it is more convenient to do so.

Holder 116 must have some facility for providing means for adjustably clamping housing 118 at a predetermined distance from with respect to disc 108. In this instance, the threads on housing 118 and holder 116 are slightly interfering so as to provide the necessary friction for maintaining the initial distance setting of housing 118.

In practice, device 114 should be mounted on the axle assembly in a position where head 20 is adjacent a wear surface on the disc where it will be relatively unaffected by rust and scale formed on disc surfaces. If mounted inboard as shown in FIG. 6, the device should be mounted as close to top of the braking surface of disc 110 as is possible.

If for other reasons, device 114 is to be mounted outboard of the disc 108, it should be mounted at the lowest point possible, adjacent the outer braking surface of the disc 108.

This device will detect eccentric movement of a rotary braking element (drum or disc) when the element has moved from its normal operating position. The failure of the smaller diameter bearing on the hub is judged to be extremely serious because it will ultimately allow the entire dual wheel-brake drum assembly to leave the spindle as a unit.

The assumption that the smaller outboard tapered bearing will fail more frequently than the larger inboard bearing is of paramount importance to the placement of the sensing device in a disc or drum application.

For brake drum applications, the probe 18 should be oriented to point downwardly as much as is physically possible given the location, and the probe should point forward in the direction of travel of the vehicle.

For vehicles equipped with disc brakes, the preferred mounting location is in a place inboard of the disc and preferably at the highest point possible. This will detect any disc deflection caused by failure of the outboard bearing.

Failure of the larger inboard bearing, while serious enough, does not usually involve the loss of rotating elements before the bearing failure is detected. The device of this invention will detect a very small movement of a rotating brake element which moves out of its normal orbit to touch the sensing head of the probe of this invention.

I claim:

1. A wheel bearing failure detection device for detecting a bearing failure in a wheel hub of a commercial transport vehicle comprising:

axle means suitably mounted on said vehicle for supporting a rotating wheel assembly thereon, said axle having a housing and spindle means for rotatingly mounting said wheel hub on said spindle in a pair of suitable bearings, said hub having means for attaching a braking element and at least one wheel assembly thereon for rotation therewith;

probe means mounted on said housing in predetermined spaced relationship with said rotatable braking element, said probe having a protruding sensing element for detecting movement of said rotatable braking element toward said probe sensing element, said probe means having signal generation means therein for generating a signal when said rotatable braking element has moved a predetermined distance toward said probe.

2. A wheel bearing failure detection device as claimed in claim 1 wherein said braking element is a drum which is contacted by a pair of brake shoes during a braking operation.

3. A wheel bearing failure detection device as claimed in claim 2 wherein said probe means is mounted on said housing inside the drum in such a manner that it protrudes in a forward direction between said shoes to a predetermined location at a preselected distance from said drum.

4. A wheel bearing failure detector as claimed in claim 3 wherein said probe means slopes forwardly and downwardly.

5. A wheel bearing failure detector as claimed in claim 4 wherein the protruding sensing element of said probe means is biased toward said drum but is resistably yieldable for motion away from said rotatable drum.

6. A wheel bearing failure detector as claimed in claim 5 wherein said sensing element is electrically conductive so as to produce an electric signal if said drum contacts said sensing element.

7. A wheel bearing failure detection device as claimed in claim 1 wherein said braking element is a disc which is contacted by braking pads in a caliper assembly during a braking operation, wherein said probe is mounted on said housing adjacent said disc.

8. A wheel bearing failure detection device as claimed in claim 7 wherein said disc has a pair of opposing braking surfaces contacted by said braking pads during a braking operation, and said probe is mounted on said housing inboard of said disc so as to be a predetermined distance from the adjacent braking surface of said disc, said probe being located near the periphery of said disc braking surface, near the top of said disc.

9. A wheel bearing failure detection device as claimed in claim 8 in which said probe means has a yieldable protruding sensing element which is biased toward said braking surface but spaced a predetermined distance therefrom.

10. A wheel bearing failure detection device as claimed in claim 9 wherein said sensing element is electrically conductive so as to produce an electric signal of said disc contacts said sensing element.

* * * * *